US012804184B2

(12) United States Patent
Zhao et al.

(10) Patent No.: US 12,804,184 B2
(45) Date of Patent: Nov. 17, 2026

(54) SYSTEMS AND METHODS FOR BILATERAL MATCHING FOR ADAPTIVE MVD RESOLUTION

(71) Applicant: TENCENT AMERICA LLC, Palo Alto, CA (US)

(72) Inventors: Liang Zhao, Palo Alto, CA (US); Xin Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 254 days.

(21) Appl. No.: 18/127,558

(22) Filed: Mar. 28, 2023

(65) Prior Publication Data

US 2023/0362402 A1 Nov. 9, 2023

Related U.S. Application Data

(60) Provisional application No. 63/339,869, filed on May 9, 2022.

(51) Int. Cl.

*H04N 19/70* (2014.01)
*H04N 19/176* (2014.01)
*H04N 19/513* (2014.01)

(52) U.S. Cl.

CPC ......... *H04N 19/513* (2014.11); *H04N 19/176* (2014.11); *H04N 19/70* (2014.11)

(58) Field of Classification Search

CPC .... H04N 19/513; H04N 19/176; H04N 19/70; H04N 19/52; H04N 19/523; H04N 19/139; H04N 19/543; H04N 19/573

(Continued)

(56) References Cited

U.S. PATENT DOCUMENTS

| | | | | |
|---|---|---|---|---|
| 2020/0404253 A1* | 12/2020 | Chen | ........................ | B23P 15/00 |
| 2021/0168355 A1* | 6/2021 | Chen | .................... | H04N 19/105 |

(Continued)

FOREIGN PATENT DOCUMENTS

| | | | | |
|---|---|---|---|---|
| EP | 3264769 A1 | 1/2018 | | |
| WO | WO-2020247577 A1 * | 12/2020 | ............. | H04N 19/70 |
| WO | WO 2021202104 A1 | 10/2021 | | |

OTHER PUBLICATIONS

Benjamin Bross, et al., "Versatile Video Coding Editorial Refinements on Draft 10", Joint Video Experts Team (JVET) of ITU-T SG 16 WP 3 and ISO/IEC JTC 1/SC 29, Document: JVET-T2001-v2, Oct. 7, 2020, 511 pgs.

(Continued)

*Primary Examiner* — Jamie J Atala
*Assistant Examiner* — Mahmoud Kamal Abouzahra
(74) *Attorney, Agent, or Firm* — Morgan, Lewis & Bockius LLP

(57) ABSTRACT

The various implementations described herein include methods and systems for coding video. The methods include receiving a signaled motion vector difference (MVD) of a video block from the video stream; in response to a determination that a joint adaptive MVD resolution mode is signaled, searching for a first prediction video block and a second prediction video block for the video block, wherein the first prediction video block or the second prediction video block is a reconstructed/predicted forward or backward video block of the video block; locating the first prediction video block and the second prediction video block based on a minimum difference measured by a cost criterion between the first prediction block and the second prediction block; refining a motion vector (MV) of the video block based on the located first prediction video block and the located second prediction video block; and reconstruct- (Continued)

ing/processing the video block based on at least the refined MV.

18 Claims, 6 Drawing Sheets

(58) Field of Classification Search
USPC .................................................... 375/240.12
See application file for complete search history.

(56) References Cited

U.S. PATENT DOCUMENTS

2022/0103828 A1* 3/2022 Zhang .................... H04N 19/52
2023/0300363 A1* 9/2023 Zhao ...................... H04N 19/56
375/240.16

OTHER PUBLICATIONS

Elliott Karpilovsky, et al., "Proposal: New Inter Modes for AV2", Alliance for Open Media, Codec Working Group Document: CWG-B018_v1, Feb. 24, 2021, 6 pgs.
Leo Zhao, et al., "Advanced Motion Vector Difference Coding", Alliance for Open Media, Codec Working Group Document: CWG-B092, Nov. 24, 2021, 7 pgs.
Leo Zhao, et al., "Improved Adaptive MVD Resolution", Alliance for Open Media, Codec Working Group Document: CWG-C011, Feb. 9, 2022, 7 pgs.
Lester (Keng-Shih) Lu, et al., "Optical Flow Motion Vector Refinement for AV2", Document: CWG-B041_v3, Alliance for Open Media Codec Working Group, Sep. 20, 2021, 11 pgs.
Mohammed Golam Sarwer, et al., "Flexible MVD Precision", Alliance for Open Media Codec Working Group, Document: CWG-C012_v1, Feb. 9, 2022, 6 pgs.
Peter de Rivaz, et al., "AV1 Bitstream & Decoding Process Specification", The Alliance for Open Media, Jan. 8, 2019, 681 pgs.
Xin Zhao, et al., "Tool Description for AV1 and Libaom", Alliance for Open Media Codec Working Group, Document: CWG-B078_v1, Oct. 4, 2021, 41 pgs.
Yue Chen, et al., "An Overview of Core Coding Tools in the AV1 Video Codec", 2018 IEEE, 5 pgs.
Tencent Technology, ISRWO, PCT/US2023/016746, Jun. 26, 2023, 9 pgs.
Tencent America, Extended European Search Report, EP Patent Application No. 23785707.3, Feb. 13, 2026, 15 pgs.
International Telecommunication Union, "" Telecommunication Standardization Sector of ITU, No. H.266, Jan. 2026, 530 pgs., Retrieved from the Internet: https://www.itu.int/rec/T-REC-H.266.
Liang Zhao et al., "Advanced Motion Vector Difference Coding Beyond AV1", IEEE International Conference on Image Processing (ICIP), Oct. 2022, 5 pgs.
Wei-Jung Chien et al., "Motion Vector Coding and Block Merging in the Versatile Video Coding Standard", IEEE Transactions on Circuits and Systems for Video Technology, vol. 31, Issue: 10, Oct. 2021, 14 pgs.

* cited by examiner

SYSTEMS AND METHODS FOR BILATERAL MATCHING FOR ADAPTIVE MVD RESOLUTION

CROSS-REFERENCE TO RELATED APPLICATION

This application claims priority to U.S. Provisional Patent Application No. 63/339,869, entitled "BILATERAL MATCHING FOR ADAPTIVE MOTION VECTOR RESOLUTION" filed May 9, 2022, which is hereby incorporated by reference in its entirety.

TECHNICAL FIELD

The disclosed embodiments relate generally to video coding, including but not limited to systems and methods for bilateral matching for adaptive motion vector difference (MVD) resolution.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes advanced video coding technologies, more specifically, a bilateral matching method for adaptive MVD resolution.

In accordance with some embodiments, a method of video coding is performed by a computing system. The method includes determining, based on one or more syntax elements from the video stream, whether a joint adaptive motion vector difference (MVD) resolution mode is signaled, the joint adaptive MVD resolution mode being an inter-prediction mode with a MVD from a first and a second reference frames jointly signaled with adaptive MVD pixel resolution; receiving a signaled MVD of a video block within a current frame from the video stream; in response to a determination that the joint adaptive MVD resolution mode is signaled, searching for a first prediction video block within the first reference frame and a second prediction video block within the second reference frame for the video block, wherein the first prediction video block is a reconstructed/predicted forward or backward video block of the video block, and the second prediction video block is a reconstructed/predicted forward or backward video block of the video block; locating the first prediction video block and the second prediction video block based on a minimum difference measured by a cost criterion between the first prediction block and the second prediction block; refining the signaled MVD of the video block based on the located first prediction video block and the located second prediction video block; refining a motion vector (MV) of the video block based on the refined MVD of the video block; and reconstructing/processing the video block based on at least the refined MV.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

Figure 1:
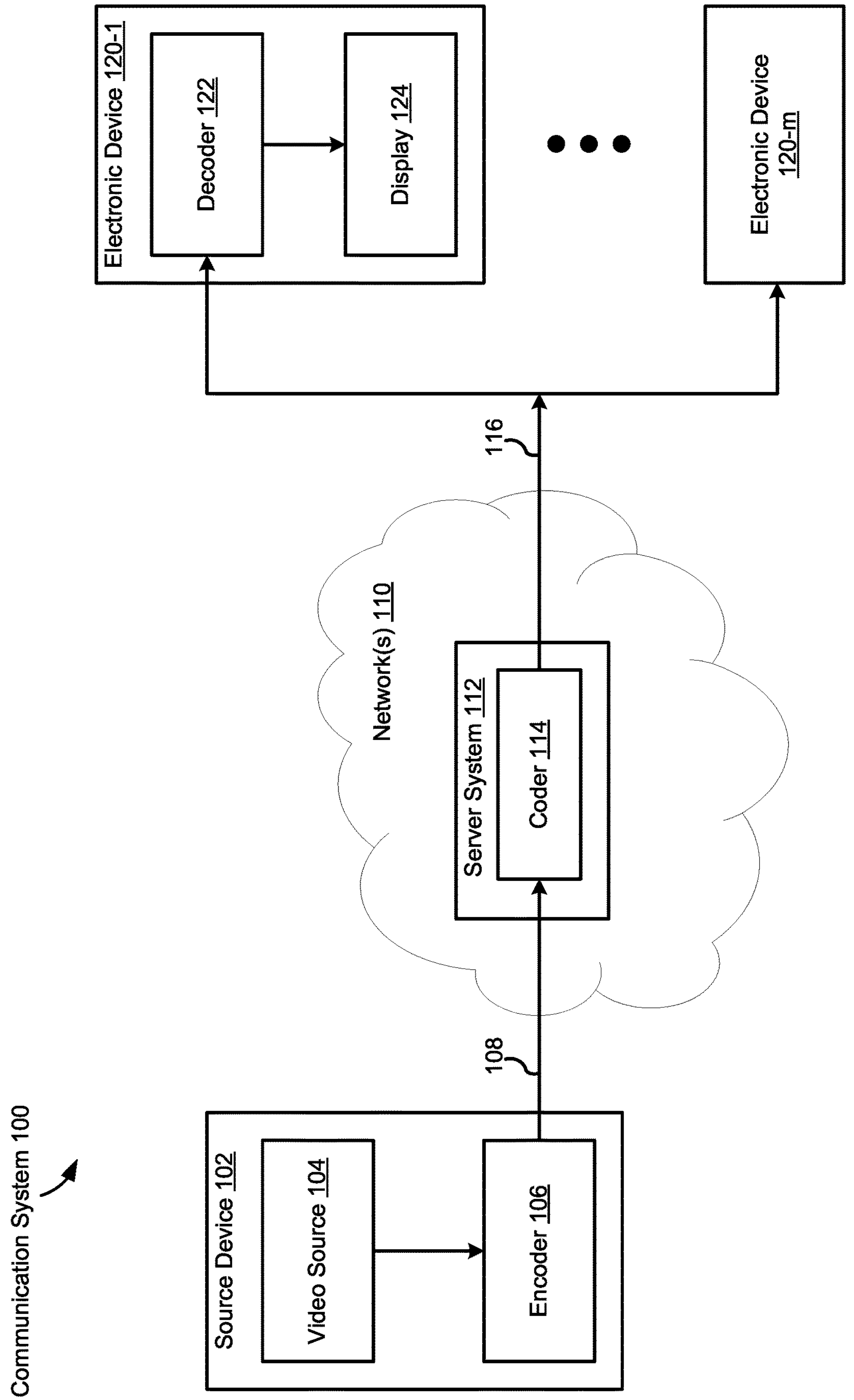
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
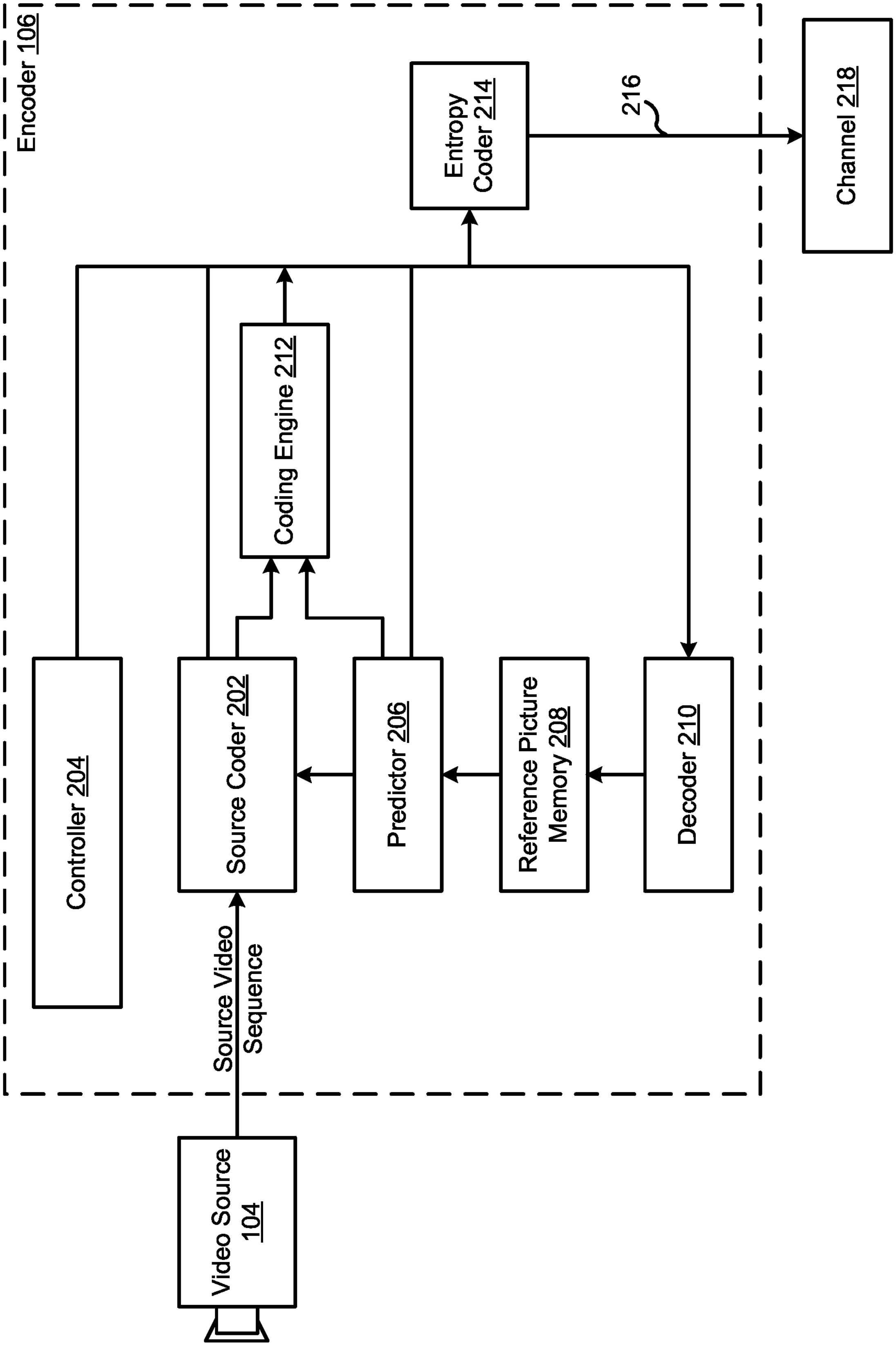
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
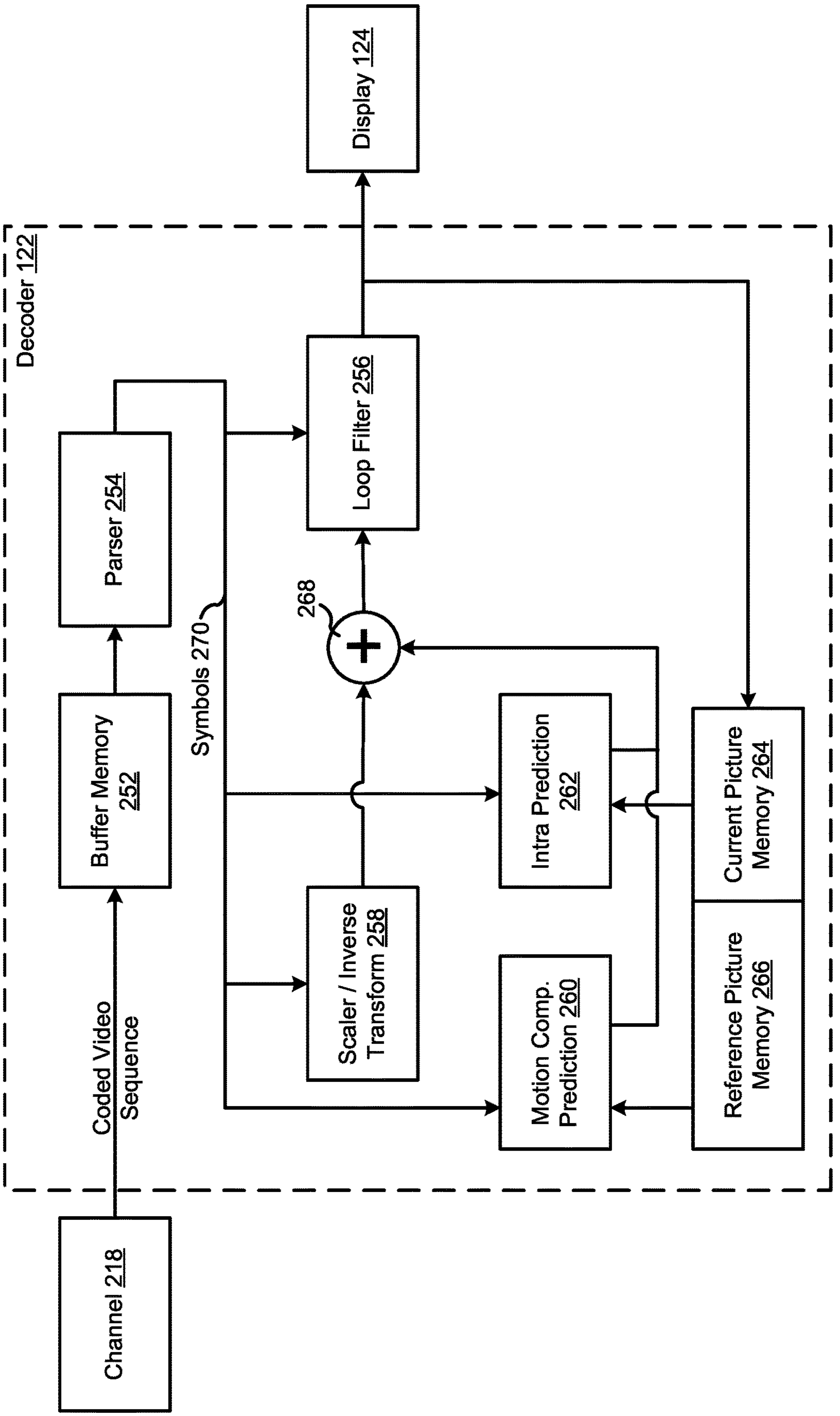
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
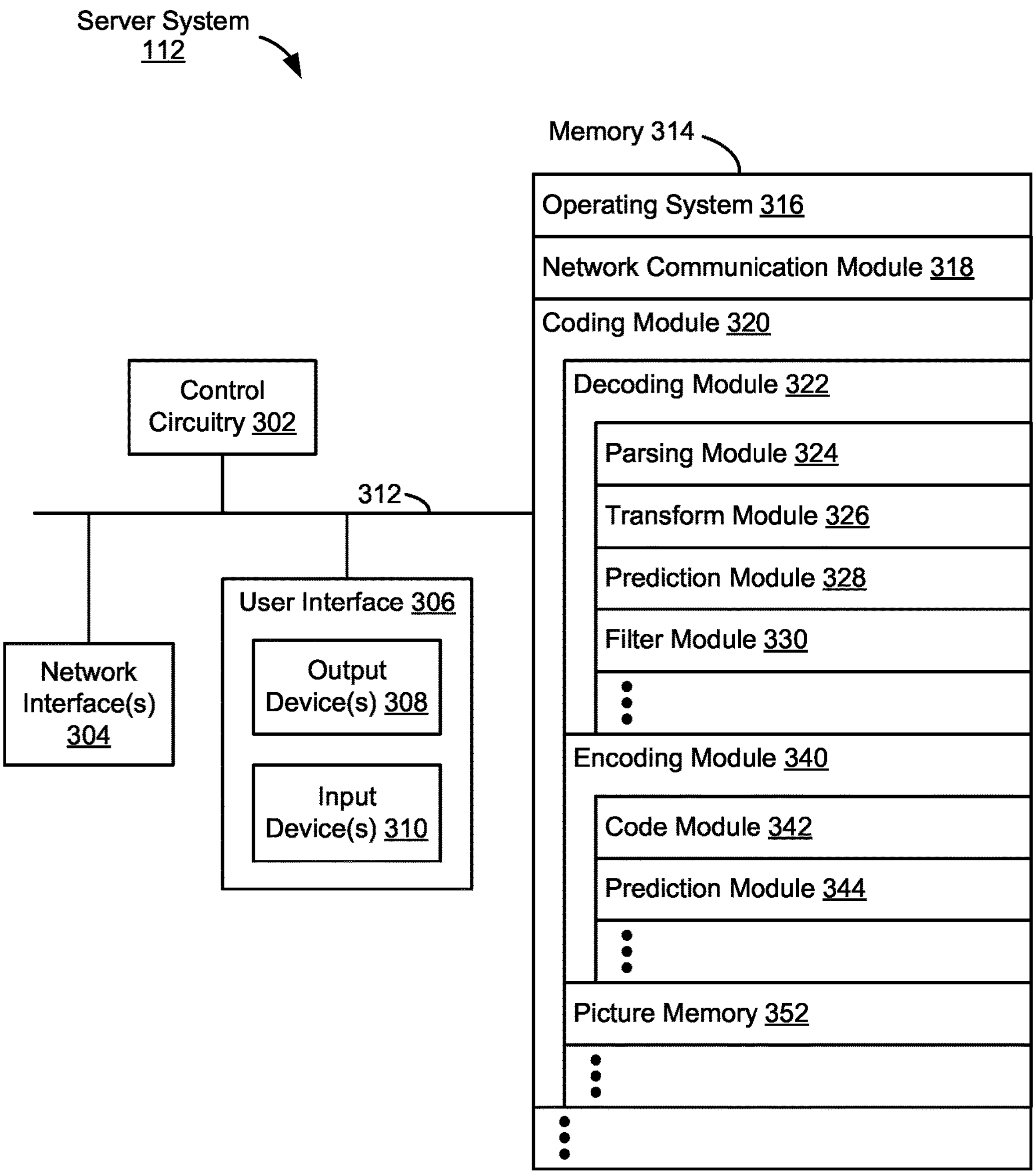
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

In some implementations, the prediction blocks (PBs or coding blocks (CBs), also referred to as PBs when not being further partitioned into prediction blocks) obtained from any of the partitioning schemes may become the individual blocks for coding via either intra or inter predictions. For inter-prediction for a current PB, a residual between the current block and a prediction block may be generated, coded, and included in the coded bitstream.

In some implementations, inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The compound-reference mode may be referred as more-than-one-reference mode, two-reference mode, or multiple-reference mode. The reference block or reference blocks may be identified using reference frame index or indices and additionally using corresponding motion vector or motion vectors which indicate shift(s) between the reference block(s) and the current blocks in location, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some implementations, an encoding or decoding system may maintain a decoded picture buffer (DPB). Some images/pictures may be maintained in the DPB waiting for being displayed (in a decoding system) and some images/pictures in the DPB may be used as reference frames to enable inter-prediction (in a decoding system or encoding system). In some implementations, the reference frames in the DPB may be tagged as either short-term references or long-term references for a current image being encoded or decoded. For example, short-term reference frames may include frames that are used for inter-prediction for blocks in a current frame or in a predefined number (e.g., 2) of closest subsequent video frames to the current frame in a decoding order. The long-term reference frames may include frames in the DPB that can be used to predict image blocks in frames that are more than the predefined number of frames away from the current frame in the order of decoding. Information about such tags for short and long-term reference frames may be referred to as Reference Picture Set (RPS) and may be added to a header of each frame in the encoded bitstream. Each frame in the encoded video stream may be identified by a Picture Order Counter (POC), which is numbered according to playback sequence in an absolute manner or relevant to a picture group starting from, for example, an I-frame.

In some example implementations, one or more reference picture lists containing identification of short-term and long-term reference frames for inter-prediction may be formed based on the information in the RPS. For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the block to be predicted. Bi-directional inter-prediction may only be compound mode in that bi-directional inter-prediction involves at least two reference blocks.

In some implementations, a merge mode (MM) for inter-prediction may be implemented. Generally, for the merge mode, the motion vector in single-reference prediction or one or more of the motion vectors in compound-reference prediction for the current PB may be derived from other motion vector(s) rather than being computed and signaled independently. For example, in an encoding system, the current motion vector(s) for the current PB may be represented by difference(s) between the current motion vector(s) and other one or more already encoded motion vectors (referred to as reference motion vectors). Such difference(s) in motion vector(s) rather than the entirety of the current motion vector(s) may be encoded and included in the bit stream and may be linked to the reference motion vector(s). Correspondingly in a decoding system, the motion vector(s) corresponding to the current PB may be derived based on the decoded motion vector difference(s) and decoded reference motion vector(s) linked therewith. As a specific form of the general merge mode (MM) inter-prediction, such inter-prediction based on motion vector difference(s) may be referred to as Merge Mode with Motion Vector Difference (MMVD). MM in general or MMVD in particular may thus be implemented to leverage correlations between motion vectors associated with different PBs to improve coding efficiency. For example, neighboring PBs may have similar motion vectors and thus the MVD may be small and can be efficiently coded. For another example, motion vectors may correlate temporally (between frames) for similarly located/positioned blocks in space.

In some example implementations, an MM flag may be included in a bitstream during an encoding process for indicating whether the current PB is in a merge mode. Additionally, or alternatively, an MMVD flag may be included during the encoding process and signaled in the bitstream to indicate whether the current PB is in an MMVD mode. The MM and/or MMVD flags or indicators may be provided at the PB level, the coding block (CB) level, the coding unit (CU) level, the coding tree block (CTB) level, the coding tree unit (CTU) level, slice level, picture level, and the like. For a particular example, both an MM flag and an MMVD flag may be included for a current CU, and the MMVD flag may be signaled right after the skip flag and the MM flag to specify whether the MMVD mode is used for the current CU.

In some example implementations of MMVD, a list of reference motion vector (RMV) or MV predictor candidates for motion vector prediction may be formed for a block being predicted. The list of RMV candidates may contain a predetermined number (e.g., 2) of MV predictor candidate blocks whose motion vectors may be used for predicting the current motion vector. The RMV candidate blocks may include blocks selected from neighboring blocks in the same frame and/or temporal blocks (e.g., identically located blocks in proceeding or subsequent frame of the current frame). These options represent blocks at spatial or temporal locations relative to the current block that are likely to have similar or identical motion vectors to the current block. The size of the list of MV predictor candidates may be predetermined. For example, the list may contain two or more candidates. To be on the list of RMV candidates, a candidate block, for example, may be required to have the same reference frame (or frames) as the current block, must exist (e.g., when the current block is near the edge of the frame, a boundary check needs to be performed), and must be already encoded during an encoding process, and/or already decoded during a decoding process. In some implementations, the list of merge candidates may be first populated with spatially neighboring blocks (scanned in particular predefined order) if available and meeting the conditions above, and then the temporal blocks if space is still available in the list. The neighboring RMV candidate blocks, for example, may be selected from left and top blocks of the current bock. The list of RMV predictor candidates may be dynamically formed at various levels (sequence, picture, frame, slice, superblock, etc.) as a Dynamic Reference List (DRL). DRL may be signaled in the bitstream.

In some implementations, an actual MV predictor candidate being used as a reference motion vector for predicting a motion vector of the current block may be signaled. In the case that the RMV candidate list contains two candidates, a one-bit flag, referred to as merge candidate flag may be used to indicate the selection of the reference merge candidate. For a current block being predicted in compound mode, each of the multiple motion vectors predicted using a MV predictor may be associated with reference motion vector from the merge candidate list. The encoder may determine which of the RMV candidate more closely predicts a current coding block and signal the selection as an index into the DRL.

In some example implementations of MMVD, after a RMV candidate is selected and used as base motion vector predictor (MVP) for a motion vector to be predicted, a motion vector difference (MVD or a delta MV, representing the difference between the motion vector to be predicted and the reference candidate motion vector) may be calculated in the encoding system. Such MVD may include information representing a magnitude of MV difference and a direction of the MV difference, both of which may be signaled in the bitstream. The motion difference magnitude and the motion difference direction may be signaled in various manners.

In some example implementations of the MMVD, a distance index may be used to specify magnitude information of the motion vector difference and to indicate one of a set of pre-defined offsets representing predefined motion vector difference from the starting point (the reference motion vector). An MV offset according to the signaled index may then be added to either horizontal component or vertical component of the starting (reference) motion vector. Whether the horizontal or vertical component of the reference motion vector should be offset may be determined by directional information of the MVD. An example predefined relation between distance index and predefined offsets is specified in Table 1.

TABLE 1

Example relation of distance index and pre-defined MV offset

| Distance Index | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

In some example implementations of the MMVD, a direction index may be further signaled and used to represent a direction of the MVD relative to the reference motion vector. In some implementations, the direction may be restricted to either one of the horizontal and vertical directions. An example 2-bit direction index is shown in Table 2. In the example of Table 2, the interpretation of the MVD could be variant according to the information of the starting/reference MVs. For example, when the starting/reference MV corresponds to a uni-prediction block or corresponds to a bi-prediction block with both reference frame lists point to the same side of the current picture (i.e. POCs of the two reference pictures are both larger than the POC of the current picture, or are both smaller than the POC of the current picture), the sign in Table 2 may specify the sign (direction) of MV offset added to the starting/reference MV. When the starting/reference MV corresponds to a bi-prediction block with the two reference pictures at different sides of the current picture (i.e. the POC of one reference picture is larger than the POC of the current picture, and the POC of the other reference picture is smaller than the POC of the current picture), and a difference between the reference POC in picture reference list 0 and the current frame is greater than that between the reference POC in picture reference list 1 and the current frame, the sign in Table 2 may specify the sign of MV offset added to the reference MV corresponding to the reference picture in picture reference list 0, and the sign for the offset of the MV corresponding to the reference picture in picture reference list 1 may have an opposite value (opposite sign for the offset). Otherwise, if the difference between the reference POC in picture reference list 1 and the current frame is greater than that between the reference POC in picture reference list 0 and the current frame, the sign in Table 2 may then specify the sign of MV offset added to the reference MV associated with the picture reference list 1 and the sign for the offset to the reference MV associated with the picture reference list 0 has opposite value.

TABLE 2

Example implementations for sign of MV offset specified by direction index

| Direction IDX | 00 | 01 | 10 | 11 |
|---|---|---|---|---|
| x-axis (horizontal) | + | − | N/A | N/A |
| y-axis (vertical) | N/A | N/A | + | − |

In some example implementations, the MVD may be scaled according to the difference of POCs in each direction. If the differences of POCs in both lists are the same, no scaling is needed. Otherwise, if the difference of POC in reference list 0 is larger than the one of reference list 1, the MVD for reference list 1 is scaled. If the POC difference of reference list 1 is greater than list 0, the MVD for list 0 may be scaled in the same way. If the starting MV is uni-predicted, the MVD is added to the available or reference MV.

In some example implementations of MVD coding and signaling for bi-directional compound prediction, in addition or alternative to separately coding and signaling the two MVDs, a symmetric MVD coding may be implemented such that only one MVD needs signaling and the other MVD may be derived from the signaled MVD. In such implementations, motion information including reference picture indices of both list-0 and list-1 is signaled. However, only MVD associated with, e.g., reference list-0 is signaled and MVD associated with reference list-1 is not signaled but derived. Specifically, at a slice level, a flag may be included in the bitstream, referred to as "mvd_l1_zero_flag," for indicating whether the reference list-1 is not signaled in the bitstream. If this flag is 1, indicating that reference list-1 is equal to zero (and thus not signaled), then a bi-directional-prediction flag, referred to as "BiDirPredFlag" may be set to 0, meaning that there is no bi-directional-prediction. Otherwise, if mvd_l1_zero_flag is zero, if the nearest reference picture in list-0 and the nearest reference picture in list-1 form a forward and backward pair of reference pictures or a backward and forward pair of reference pictures, BiDirPredFlag may be set to 1, and both list-0 and list-1 reference pictures are short-term reference pictures. Otherwise BiDirPredFlag is set to 0. BiDirPredFlag of 1 may indicate that a symmetrical mode flag is additionally signaled in the bitstream. The decoder may extract the symmetrical mode flag from the bitstream when BiDirPredFlag is 1. The symmetrical mode flag, for example, may be signaled (if needed) at the CU level and it may indicate whether the symmetrical MVD coding mode is being used for the corresponding CU. When the symmetrical mode flag is 1, it indicates the use of the symmetrical MVD coding mode, and that only reference picture indices of both list-0 and list-1 (referred to as "mvp_l0_flag" and "mvp_l1_flag") are signaled with MVD associated with the list-0 (referred to as "MVD0"), and that the other motion vector difference, "MVD1", is to be derived rather than signaled. For example, MVD1 may be derived as −MVD0. As such, only one MVD is signaled in the example symmetrical MVD mode. In some other example implementations for MV prediction, a harmonized scheme may be used to implement a general merge mode, MMVD, and some other types of MV prediction, for both single-reference mode and compound-reference mode MV prediction. Various syntax elements may be used to signal the manner in which the MV for a current block is predicted.

For example, for single-reference mode, the following MV prediction modes may be signaled:

NEARMV—use one of the motion vector predictors (MVP) in the list indicated by a DRL (Dynamic Reference List) index directly without any MVD.

NEWMV—use one of the motion vector predictors (MVP) in the list signaled by a DRL index as reference and apply a delta to the MVP (e.g., using MVD).

GLOBALMV—use a motion vector based on frame-level global motion parameters.

Likewise, for the compound-reference inter-prediction mode using two reference frames corresponding to two MVs to be predicted, the following MV prediction modes may be signaled:

NEAR_NEARMV—use one of the motion vector predictors (MVP) in the list signaled by a DRL index without MVD for each of the two of MVs to be predicted.

NEAR_NEWMV—for predicting the first of the two motion vectors, use one of the motion vector predictors (MVP) in the list signaled by a DRL index as reference MV without MVD; for predicting the second of the two motion vectors, use one of the motion vector predictors (MVP) in the list signaled by a DRL index as reference MV in conjunction with an additionally signaled delta MV (an MVD).

NEW_NEARMV—for predicting the second of the two motion vectors, use one of the motion vector predictors (MVP) in the list signaled by a DRL index as reference MV without MVD; for predicting the first of the two motion vectors, use one of the motion vector predictors (MVP) in the list signaled by a DRL index as reference MV in conjunction with an additionally signaled delta MV (an MVD).

NEW_NEWMV—use one of the motion vector predictors (MVP) in the list signaled by a DRL index as reference MV and use it in conjunction with an additionally signaled delta MV to predict for each of the two MVs.

GLOBAL_GLOBALMV—use MVs from each reference based on their frame-level global motion parameters.

The term "NEAR" above thus refers to MV prediction using reference MV without MVD as a general merge mode, whereas the term "NEW" refers to MV prediction involving using a referend MV and offsetting it with a signaled MVD as in an MMVD mode. For the compound inter-prediction, both the reference base motion vectors and the motion vector deltas above, may be generally different or independent between the two references, even though they may be correlated, and such correlation may be leveraged to reduce the amount of information needed for signaling the two motion vector deltas. In such situations, a joint signaling of the two MVDs may be implemented and indicated in the bitstream.

The dynamic reference list (DRL) above may be used to hold a set of indexed motion vectors that are dynamically maintained and are considered as candidate motion vector predictors.

In some example implementations, a predefined resolution for the MVD may be allowed. For example, a ⅛-pixel motion vector precision (or accuracy) may be allowed. The MVD described above in the various MV prediction modes may be constructed and signaled in various manners. In some implementations, various syntax elements may be used to signal the motion vector difference(s) above in reference frame list 0 or list 1.

For example, a syntax element referred to as "mv_joint" may specify which components of the motion vector difference associated therewith are non-zero. For an MVD, this is jointly signaled for all the non-zero components. For example, mv_joint having a value of 0 may indicate that there is no non-zero MVD along either the horizontal or the vertical direction;

1 may indicate that there is non-zero MVD only along the horizontal direction;

2 may indicate that there is non-zero MVD only along the vertical direction;

3 may indicate that there is non-zero MVD along both the horizontal and the vertical directions.

When the "mv_joint" syntax element for an MVD signals that there is no non-zero MVD component, then no further MVD information may be signaled. However, if the "mv_joint" syntax signals that there is one or two non-zero components, then additional syntax elements may be further signaled for each of the non-zero MVD components as described below.

For example, a syntax element referred to as "mv_sign" may be used to additionally specify whether the corresponding motion vector difference component is positive or negative.

For another example, a syntax element referred to as "mv_class" may be used to specify a class of the motion vector difference among a predefined set of classes for the corresponding non-zero MVD component. The predefined classes for motion vector difference, for example, may be used to divide a contiguous magnitude space of the motion vector difference into non-overlapping ranges with each range corresponding to an MVD class. A signaled MVD class thus indicates the magnitude range of the corresponding MVD component. In the example implementation shown in Table 3 below, a higher class corresponds to motion vector differences having range of a larger magnitude. In Table 3, the symbol (n, m] is used for representing a range of motion vector difference that is greater than n pixels, and smaller than or equal to m pixels.

TABLE 3

Magnitude class for motion vector difference

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

In some other examples, a syntax element referred to as "mv_bit" may be further used to specify an integer part of the offset between the non-zero motion vector difference component and starting magnitude of a correspondingly signaled MV class magnitude range. The number of bits needed in "mv_bit" for signaling a full range of each MVD class may vary as a function of the MV class. For the example, MV_CLASS 0 and MV_CLASS 1 in the implementation of Table 3 may merely need a single bit to indicate integer pixel offset of 1 or 2 from starting MVD of 0; each higher MV_CLASS in the example implementation of Table 3 may need progressively one more bit for "mv_bit" than the previous MV_CLASS.

In some other examples, a syntax element referred to as "mv_fr" may be further used to specify first 2 fractional bits of the motion vector difference for a corresponding non-zero MVD component, whereas a syntax element referred to as "mv_hp" may be used to specify a third fractional bit of the motion vector difference (high resolution bit) for a corresponding non-zero MVD component. The two-bit "mv_fr" essentially provides ¼ pixel MVD resolution, whereas the "mv_hp" bit may further provide a ⅛-pixel resolution. In some other implementations, more than one "mv_hp" bit may be used to provide MVD pixel resolution finer than ⅛ pixels. In some example implementations, additional flags may be signaled at one or more of the various levels to indicate whether ⅛-pixel or higher MVD resolution is supported. If MVD resolution is not applied to a particular coding unit, then the syntax elements above for the corresponding non-supported MVD resolution may not be signaled.

In some example implementations above, fractional resolution may be independent of different classes of MVD. In other words, regardless of the magnitude of the motion vector difference, similar options for motion vector resolution may be provided using a predefined number of "mv_fr" and "mv_hp" bits for signaling the fractional MVD of a non-zero MVD component.

However, in some other example implementations, resolution for motion vector difference in various MVD magnitude classes may be differentiated. Specifically, high resolution MVD for large MVD magnitude of higher MVD classes may not provide statistically significant improvement in compression efficiency. As such, the MVDs may be coded with decreasing resolution (integer pixel resolution or fractional pixel resolution) for larger MVD magnitude ranges, which correspond to higher MVD magnitude classes. Likewise, the MVD may be coded with decreasing resolution (integer pixel resolution or fractional pixel resolution) for larger MVD values in general. Such MVD class-dependent or MVD magnitude-dependent MVD resolution may be generally referred to as adaptive MVD resolution, amplitude-dependent adaptive MVD resolution, or magnitude-dependent MVD resolution. The term "resolution" may be further referred to as "pixel resolution" Adaptive MVD resolution may be implemented in various matter as described by the example implementations below for achieving an overall better compression efficiency. In particular, the reduction of number of signaling bits by aiming at less precise MVD may be greater than the additional bits needed for coding inter-prediction residual as a result of such less precise MVD, due to the statistical observation that treating MVD resolution for large-magnitude or high-class MVD at similar level as that for low-magnitude or low-class MVD in a non-adapted manner may not significantly increase inter-prediction residual coding efficiency for bocks with large-magnitude or high-class MVD. In other words, using higher MVD resolutions for large-magnitudes or high-class MVD may not produce much coding gain over using lower MVD resolutions.

In some general example implementations, the pixel resolution or precision for MVD may decrease or may be non-increasing with increasing MVD class. Decreasing pixel resolution for the MVD corresponds to coarser MVD (or larger step from one MVD level to the next). In some implementations, the correspondence between an MVD pixel resolution and MVD class may be specified, predefined, or pre-configured and thus may not need to be signaled in the encode bitstream.

In some example implementations, the MV classes of Table 3 my each be associated with different MVD pixel resolutions.

In some example implementations, each MVD class may be associated with a single allowed resolution. In some other implementations, one or more MVD classes may be associated with two or more optional MVD pixel resolutions. A signal in a bitstream for a current MVD component with such an MVD class may thus be followed by an additional signaling for indicating which optional pixel resolution is selected for the current MVD component.

In some example implementations, the adaptively allowed MVD pixel resolution may include but not limited to 1/64-pel (pixel), 1/32-pel, 1/16-pel, ⅛-pel, 1-4-pel, ½-pel, 1-pel, 2-pel, 4-pel . . . (in descending order of resolution). As such, each one of the ascending MVD classes may be associated with one of these resolutions in a non-ascending manner. In some implementations, an MVD class may be associated with two or more resolutions above and the higher resolution may be lower than or equal to the lower resolution for the preceding MVD class. For example, if the MV_CLASS_3 of Table 3 may be associated with optional 1-pel and 2-pel resolution, then the highest resolution that MV_CLASS_4 of Table 3 could be associated with would be 2-pel. In some other implementations, the highest allowable resolution for an MV class may be higher than the lowest allowable resolution of a preceding (lower) MV class. However, the average of allowed resolution for ascending MV classes may only be non-ascending.

In some implementations, when fractional pixel resolution higher than ⅛ pel is allowed, the "mv_fr" and "mv_hp" signaling may be correspondingly expanded to more than 3 fractional bits in total.

In some example implementations, fractional pixel resolution may only be allowed for MVD classes below or equal to a threshold MVD class. For example, fractional pixel resolution may only be allowed for MVD-CLASS 0 and disallowed for all other MV classes of Table 3. Likewise, fractional pixel resolution may only be allowed for MVD classes below or equal to any one of other MV classes of Table 3. For the other MVD classes above the threshold MVD class, only integer pixel resolutions for MVD are allowed. In Such a manner, fractional resolution signaling such as the one or more of the "mv-fr" and/or "mv-hp" bits may not need be signaled for MVD signaled with an MVD class higher than or equal to the threshold MVD class. For MVD classes having resolution lower than 1 pixel, the number of bits in "mv-bit" signaling may be further reduced. For example, for MV_CLASS_5 in Table 3, the range of MVD pixel offset is (32, 64], thus 5 bits are needed to signal the entire range with 1-pel resolution. However, if MV_CLASS_5 is associated with 2-pel MVD resolution (lower resolution than 1-pixel resolution), then 4 bits rather than 5 bits may be needed for "mv-bit", and none of "mv-fr" and "mv-hp" needs be signaled following a signaling of "mv_class" as MV-CLASS_5.

In some example implementations, fractional pixel resolution may only be allowed for MVD with integer value below a threshold integer pixel value. For example, fractional pixel resolution may only be allowed for MVD smaller than 5 pixels. Corresponding to this example, fractional resolution may be allowed for MV_CLASS_0 and MV_CLASS_1 of Table 3 and disallowed for all other MV classes. For another example, fractional pixel resolution may only be allowed for MVD smaller than 7 pixels. Corresponding to this example, fractional resolution may be allowed for MV_CLASS_0 and MV_CLASS_1 of Table 3 (with ranges below 5 pixels) and disallowed for MV_CLASS_3 and higher (with ranges above 5 pixels). For an MVD belonging to MV_CLASS_2, whose pixel range encompasses 5 pixels, fractional pixel resolution for the MVD may or may be allowed depending on the "mv-bit" value. If the "m-bit" value is signaled as 1 or 2 (such that the integer portion of the signaled MVD is 5 or 6, calculated as starting of the pixel range for MV_CLASS_2 with an offset 1 or 2 as indicated by "m-bit"), then fractional pixel resolution may be allowed. Otherwise, if the "mv-bit" value is signaled as 3 or 4 (such that the integer portion of the signaled MVD is 7 or 8), then fractional pixel resolution may not be allowed.

In some other implementations, for MV classes equal to or higher than a threshold MV class, only a single MVD value may be allowed. For example, such threshold MV class may be MV_CLASS_2. Thus, MV_CLASS_2 and above may only be allowed to have a single MVD value and without fractional pixel resolution. The single allowed MVD value for these MV classes may be predefined. In some examples, the allowed single value may be the higher end values of the respective ranges for these MV classes in Table 3. For example, MV_CLASS_2 through MV_CLASS_10 may be above or equal to the threshold class of MV_CLASS 2, and the single allowed MVD value for these classes may be predefined as 8, 16, 32, 64, 128, 256, 512, 1024, and 2048, respectively. In some other examples, the allowed single value may be the middle value of the respective ranges for these MV classes in Table 3. For example, MV_CLASS_2 through MV_CLASS_10 may be above the class threshold, and the single allowed MVD value for these classes may be predefined as 3, 6, 12, 24, 48, 96, 192, 384, 768, and 1536, respectively. Any other values within the ranges may also be defined as the single allowed resolutions for the respective MVD classes.

In the implementations above, only the "mv_class" signaling is sufficient for determining the MVD value when the signaled "mv_class" is equal to or above the predefined MVD class threshold. The magnitude and direction of the MVD would then be determined using "mv_class" and "mv_sign".

As such, when MVD is signaled for only one reference frame (either from reference frame list 0 or list 1, but not both), or jointly signaled for two reference frames, the precision (or resolution) of the MVD may depend on the associated class of motion vector difference in Table 3 and/or the magnitude of MVD.

In some other implementations, the pixel resolution or precision for MVD may decrease or may be non-increasing with increase MVD magnitude. For example, the pixel resolution may depend on integer portion of the MVD magnitude. In some implementations, fractional pixel resolution may be allowed only for MVD magnitude smaller than or equal to an amplitude threshold. For a decoder, the integer portion of the MVD magnitude may first be extracted from a bitstream. The pixel resolution may then be determined, and decision may then be made as to whether any fractional MVD is in existence in the bit stream and needs to be parsed (e.g., if the fractional pixel resolution is disallowed for a particular extracted MVD integer magnitude, then no fractional MVD bits may be included in the bitstream needing extraction). The example implementations above related to MVD-class-dependent adaptive MVD pixel resolution applies to MVD magnitude dependent adaptive MVD pixel resolution. For a particular example, MVD classes above or encompassing the magnitude threshold may be allowed to have only one predefined value.

The various example implementations above apply to single-reference mode. These implementations also apply to the example NEW_NEARMV, NEAR_NEWMV, and/or NEW_NEWMV modes in compound prediction under MMVD. These implementations apply generally to adaptive resolution for any MVD.

In some example implementations, adaptive MVD resolution is further described below. For NEW_NEARMV and NEAR_NEWMV mode, the precision of the MVD depends on the associated class and the magnitude of MVD.

In some examples, fractional MVD is allowed only if MVD magnitude is equal to or less than one-pixel.

In some examples, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5).

The allowed MVD values in each MV class are illustrated in Table 4.

TABLE 4

Adaptive MVD in each MV magnitude class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some examples, if the current block is coded as NEW_NEARMV or NEAR_NEWMV mode, one context is used for signaling mv_joint or mv_class. Otherwise, another context is used for signaling mv_joint or mv_class.

In some example implementations, joint MVD coding (JMVD) is further described below. A new inter coded mode, named as JOINT_NEWMV, may be applied to indicate whether the MVDs for two reference lists are jointly signaled. If the inter prediction mode is equal to JOINT_NEWMV mode, MVDs for reference list 0 and reference list 1 may be jointly signaled. Therefore, only one MVD, named as joint_mvd, may be signaled and transmitted to the decoder, and the delta MVs for reference list 0 and reference list 1 may be derived from joint_mvd.

In some examples, JOINT_NEWMV mode may be signaled together with NEAR_NEARMV, NEAR_NEWMV, NEW_NEARMV, NEW_NEWMV, and GLOBAL_GLOBALMV mode. No additional contexts are added.

In some examples, when JOINT_NEWMV mode is signaled, and the POC distance between two reference frames and the current frame is different, MVD may be scaled for reference list 0 or reference list 1 based on the POC distance. To be specific, the distance between reference frame list 0 and the current frame is noted as td0 and the distance between reference frame list 1 and current frame is noted as td1. If td0 is equal to or larger than td1, joint_mvd may be directly used for reference list 0 and the MVD for reference list 1 may be derived from joint_mvd based on equation (1) below.

$$\text{derived\_mvd} = \frac{td1}{td0} * \text{joint\_mvd} \quad (1)$$

Otherwise, if td1 is equal to or larger than td0, joint_mvd may be directly used for reference list 1 and the mvd for reference list 0 is derived from joint_mvd based on equation (2) below.

$$\text{derived\_mvd} = \frac{td0}{td1} * \text{joint\_mvd} \quad (2)$$

In some example implementations, improvement for adaptive MVD resolution is described below.

In some examples, a new inter coded mode, named as AMVDMV, is added to the single reference case. When AMVDMV mode is selected, it indicates that adaptive MVD (AMVD) is applied to signal MVD.

In some examples, one flag, named as amvd_flag, is added under JOINT_NEWMV mode to indicate whether AMVD is applied to joint MVD coding mode or not. When adaptive MVD resolution is applied to joint MVD coding mode, named as joint AMVD coding, MVD for two reference frames are jointly signaled and the precision of MVD is implicitly determined by MVD magnitudes. Otherwise, MVD for two (or more than two) reference frames are jointly signaled, and conventional MVD coding is applied.

In some example implementations, adaptive motion vector resolution (AMVR) is further described below. The AMVR was initially implemented where total 7 MV precisions (8, 4, 2, 1, ½, ¼, ⅛) pel (pixel) are supported. For each prediction block, AOMedia Video Model (AVM) encoder may search all the supported precision values and signal the best precision to the decoder.

In some examples, to reduce the encoder run-time, two precision sets may be supported. Each precision set may contain 4-predefined precisions. The precision set may be adaptively selected at the frame level based on the value of maximum precision of the frame. The maximum precision may be signaled in the frame header. The following Table 5 summarizes the supported precision values based on the frame level maximum precision.

TABLE 5

Supported MV precisions in two sets

| Frame level maximum precision | Supported MV precisions |
|---|---|
| ⅛ | ⅛, ½, 1, 4 |
| ¼ | ¼, 1, 4, 8 |

In some examples, in the AVM software (similar to AV1), there is a frame level flag to indicate if the MVs of the frame contains sub-pel precisions or not. The AMVR is enabled only if the value of cur_frame_force_integer_mv flag is 0. In the AMVR, if precision of the block is lower than the maximum precision, motion model and interpolation filters are not signaled. If the precision of a block is lower than the maximum precision, the motion mode may be inferred to translation motion and the interpolation filter may be inferred to REGULAR interpolation filter. Similarly, if the precision of the block is either 4-pel or 8-pel, inter-intra mode is not signaled and inferred to be 0.

In some approaches, when the adaptive MVD resolution method is applied, like the adaptive MVD coding, the precision of MVD is dependent on the magnitude of MVD. The precision of MVD decreases as the magnitude of MVD increases. As a result, the prediction may be less accurate for large MVD when adaptive MVD resolution is applied.

In some approaches, when the adaptive motion vector resolution is explicitly signaled, like the AMVR, the precision of MVD depends on the signaled flag. If the signaled flag indicates that the precision of MVD is coarser, the MVD may become less accurate.

In some examples, the methods disclosed herein may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. The term block may be interpreted as a prediction block, a coding block, or a coding unit, i.e., CU.

In this disclosure, the direction of a reference frame may be determined by whether the reference frame is prior to the current frame in the display order or after the current frame in display order.

In this disclosure, the description of maximum or highest precision for MVD signaling refers to the finest granularity of MVD precision. For instance, 1/16-pel MVD signaling represents a higher precision level than that of 1/8-pel MVD signaling.

In this disclosure, the description of finest allowed MVD resolution refers to the resolution at which MVD is being signaled. For example, when the adaptive MVD resolution is applied, the MVD can be signaled at 1/4 pel. However, when bilateral matching is also applied, the actual MVD that is used for motion compensation can be refined to 1/8 pel or higher precision without further signaling.

In some implementations, Motion Vector Predictor (MVP) and Motion Vector Difference (MVD) are two important parameters used to represent the motion vector (MV) of a current block. In inter prediction mode, MVP and MVD are used to represent the motion vector of a current block in relation to a reference block in a previous/following frame.

For example, the MVP is typically computed by using the motion vectors of neighboring blocks in the same frame, or by using the motion vectors of corresponding blocks in the reference frame. The goal of the MVP is to predict the motion of the current block based on the motion of neighboring blocks or corresponding blocks in the reference frame.

For example, the MVD is the difference between the motion vector of the current block and the MVP. The MVD represents the deviation of the actual motion vector of the current block from the predicted motion vector based on neighboring blocks or corresponding blocks in the reference frame. The MVD is typically encoded and transmitted to the decoder, along with the motion vector predictor, to enable the decoder to reconstruct the motion vector of the current block.

Figure 4:
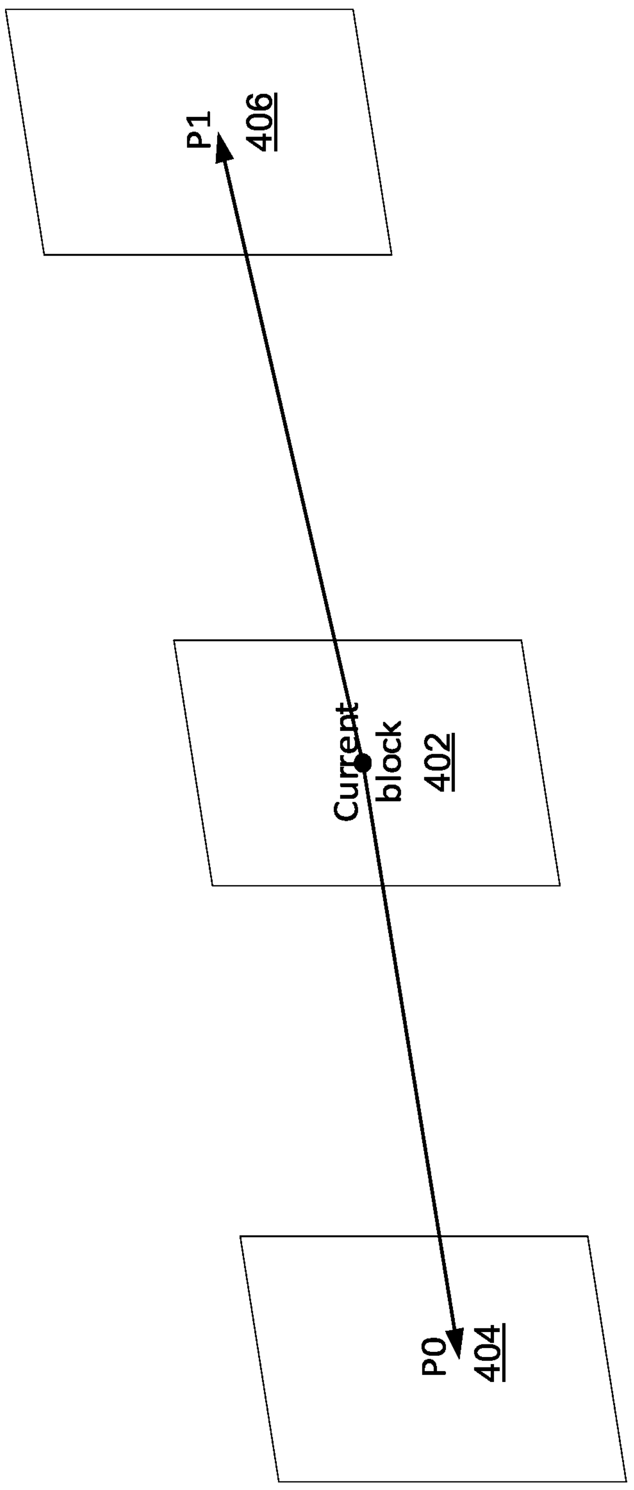
FIG. 4 is a diagram illustrating an example bilateral matching method for refining MVD in accordance with some embodiments.

FIG. 4 is a diagram illustrating an example bilateral matching method for refining MVD in accordance with some embodiments.

In some examples, the block matching method takes advantage of a correlation between the pixels in the block and those in the prediction block. For example, the best match for a given block of pixels in a frame is found with a corresponding block of pixels in a reference frame. The pixel values of the block being encoded/decoded are compared with those of each block in the reference frame and the block that has the closest match is selected. The pixels in the current block are to be predicted based on the closest matching block of pixels in the reference frame.

In some aspects/embodiments, when adaptive MVD resolution (or AMVR) is applied to joint MVD coding, named as joint AMVD coding, bilateral matching may be used to further refine the MV for the current block. The starting point for MV refinement with bilateral matching is the MV of the current block 402, which is the sum of MVP and signaled MVD (or derived MVD from joint MVD) for the current block 402. MV refinement by bilateral matching is conducted at both the encoder and decoder side, so the difference between refined MV and starting point for MV refinement is not signaled in the bitstream. Prediction block P0 404 is a backward block of the current block 402, and prediction block P1 406 is a forward block of the current block 402.

Figure 5:
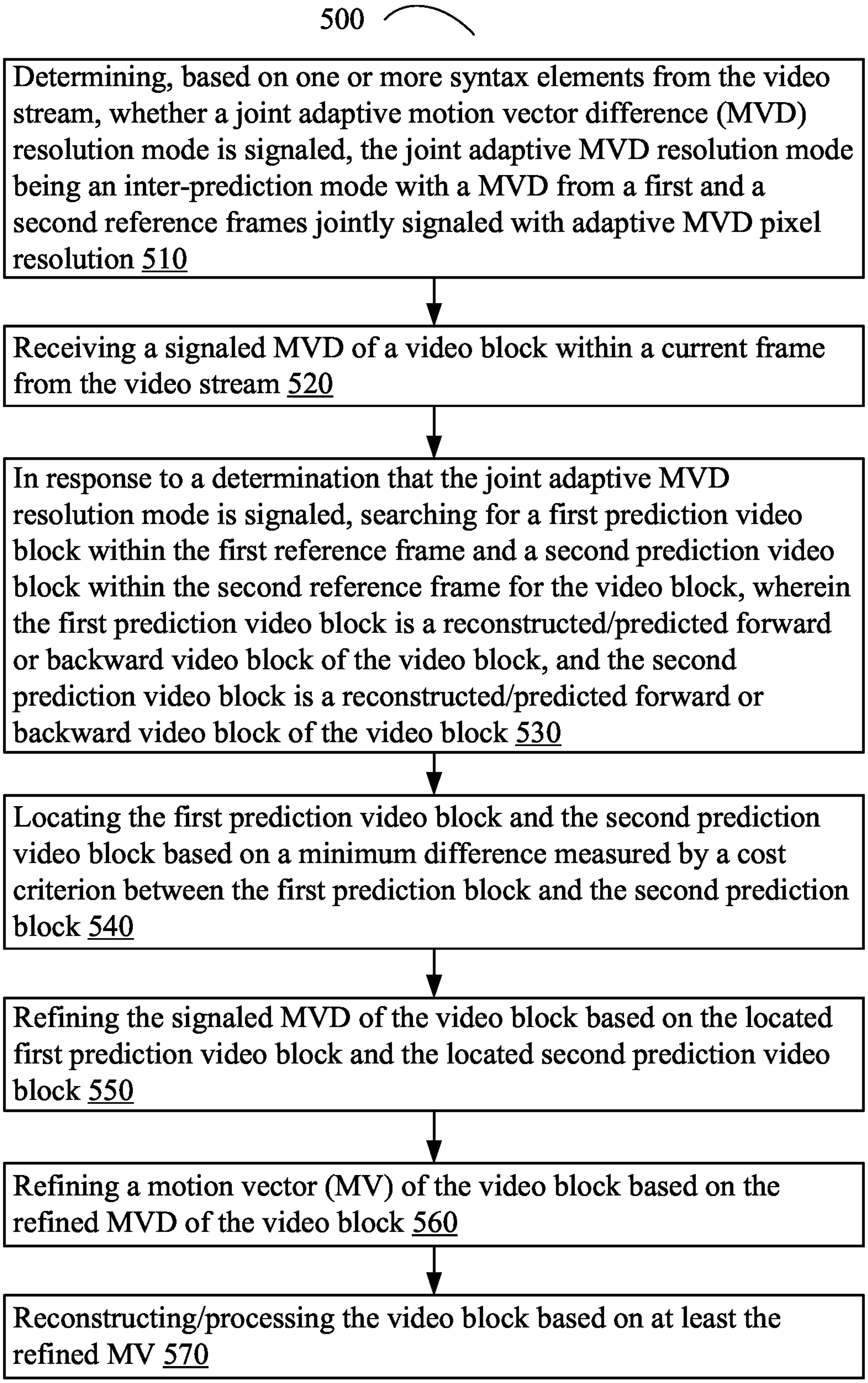
FIG. 5 is an exemplary flow diagram illustrating a method of coding video in accordance with some embodiments.

FIG. 5 is an exemplary flow diagram illustrating a method 500 of coding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 may be performed by executing instructions stored in the memory (e.g., the memory 314) of the computing system. The method 500 may be performed by an encoder (e.g., encoder 106) and/or a decoder (e.g., decoder 122).

Referring to FIG. 5, in one aspect, the video decoder (e.g., decoder 122 in FIG. 2B) and/or the video encoder (e.g., encoder 106 in FIG. 2B) determines, based on one or more syntax elements from the video stream, whether a joint adaptive motion vector difference (MVD) resolution mode is signaled, the joint adaptive MVD resolution mode being an inter-prediction mode with a MVD from a first and a second reference frames jointly signaled with adaptive MVD pixel resolution (510).

The video decoder and/or the video encoder receives a signaled MVD of a video block within a current frame from the video stream (520).

In response to a determination that the joint adaptive MVD resolution mode is signaled, the video decoder and/or the video encoder searches for a first prediction video block within the first reference frame and a second prediction video block within the second reference frame for the video block, wherein the first prediction video block is a reconstructed/predicted forward or backward video block of the video block, and the second prediction video block is a reconstructed/predicted forward or backward video block of the video block (530).

The video decoder and/or the video encoder locates the first prediction video block and the second prediction video block based on a minimum difference measured by a cost criterion between the first prediction block and the second prediction block (540).

The video decoder and/or the video encoder refines the signaled MVD of the video block based on the located first prediction video block and the located second prediction video block (550).

The video decoder and/or the video encoder refines a motion vector (MV) of the video block based on the refined MVD of the video block (560).

The video decoder and/or the video encoder reconstructs/processes the video block based on at least the refined MV (570).

In one embodiment and/or any combination of the embodiments disclosed herein, for each MVD in the allowed/given search area surrounding the MV of current block, prediction block P0 404 and P1 406 are generated with MV equal to the sum of MV (MVP+signaled MVD) and refined MVD. Then the difference between P0 404 and P1 406 are calculated and measured by a cost criterion, and the refined MVD with the minimum cost is used as the refined MVD for current block.

In some examples, the refined MVD for one reference frame (e.g., reference frame list 0) may be derived from the refined MVD for the other reference frame (e.g., reference frame list 1) based on the distance between the two reference frames and the current frame. For example, the refined MVD of the video block is a first refined MVD of the first reference frame, and a second refined MVD of the second reference frame is derived from the first refined MVD of the first reference frame.

In some examples, refined_mvd_1=(td1/td0)*refined_mvd_0. In this equation, the distance between the reference frame list 0 and current frame is noted as td0 and the distance between the reference frame list 1 and current frame is noted as td1. refined_mvd_0 and refined_mvd_1 are the refined MVD for reference frame list 0 and reference frame list 1 respectively. For example, the refined MVD of the video block is a first refined MVD of the first reference frame, and a second refined MVD of the second reference frame is derived from the first refined MVD of the first reference frame according to refined_mvd_1=(td1/td0)*refined_mvd_0, wherein td0 is a distance between the first reference frame and the current frame, td1 is a distance between the second reference frame and the current frame, and refined_mvd_0 and refined_mvd_1 are the first refined MVD of the first reference frame, and the second refined MVD of the second reference frame respectively.

In some examples, the refined MVD for one reference frame (e.g., reference frame list 0) may be mirrored from the other reference frame (e.g., reference frame list 1), i.e., refine_mvd_1=−refined_mvd_0. An additional restriction may be applied to this example. That is the relative distances between the current frame and the two reference frames are equal, i.e., td0=td1. For example, the refined MVD of the video block is a first refined MVD of the first reference frame, and a second refined MVD of the second reference frame is mirrored from the first refined MVD of the first reference frame.

In one embodiment and/or any combination of the embodiments disclosed herein, only one MVD associated with the reference frame list 0 or the reference frame list 1 may be refined using bilateral matching, while the other MVD may be derived only from the signaled MVD without further refinement. For example, the refined MVD of the video block is a first refined MVD of the first reference frame, a second MVD of the second reference frame is the signaled MVD.

In some examples, if the MVD is signaled for the reference frame list 0 (or the reference frame list 1), and the MVD for the reference frame list 1 (or the reference frame list 0) is derived from the signaled MVD, then the refinement using bilateral matching is applied on the MVD applied for list 1 (or list 0) but not applied on the MVD for list 0 (or list 1).

In one embodiment and/or any combination of the embodiments disclosed herein, the cost criterion for bilateral matching includes, but not limited to SAD (sum of absolute difference), SSE (sum of squared error), and/or SATD (sum of absolute transform difference).

In one embodiment and/or any combination of the embodiments disclosed herein, the distortion cost for bilateral matching of one or more certain positions may be modified by a factor, to make this (these) position(s) more or less preferable during the comparison. When the factor is larger than 1, the position is less preferred. When the factor is smaller than 1, the position is more preferred. For example, the cost criterion includes a distortion cost of one or more positions modified by a factor to make the one or more positions more or less preferable during the minimum difference measurement.

In some examples, the distortion cost of the start position is scaled by a factor less than 1, to make this position more preferred during the selection. One additional benefit is of this approach is that the computational complexity will be reduced.

In one embodiment and/or any combination of the embodiments disclosed herein, the search area size for bilateral matching may depend on the precision of MVD or the associated MVD class for a current block. For example, searching for the first prediction video block within the first reference frame and the second prediction video block within the second reference frame for the video block (530) comprises determining a search area size based on a precision of the MVD and searching based on the search area size.

In one embodiment and/or any combination of the embodiments disclosed herein, when AMVD is implicitly applied to the joint MVD coding, the search area size monotonically increases or keeps unchanged for bilateral matching as the magnitude of MVD increases.

In some examples, the search area size is the same for one MVD precision but different among different MVD precisions.

In some examples, when AMVD is implicitly applied to the joint MVD coding, the search area size is the same for all the MVDs in one MV class when MV class of MVD is equal to or greater than one threshold, such as MV_CLASS_1.

In one embodiment and/or any combination of the embodiments disclosed herein, the precision/granularity for MV refinement within the given search area for bilateral matching may depend on the precision of MVD and/or the magnitude of MVD and/or the associated MV class. The precision may include, but not limited to 1/64-pel, 1/32-pel, 1/16-pel, 1/8-pel, 1/4-pel, 1/2-pel, integer-pel, 1-pel, 2-pel, 3-pel, 4-pel, . . . , precisions. For example, refining the signaled MVD of the video block (550) comprises determining a refining granularity of the MVD based on the precision, a magnitude and/or an associated MV class of the MVD.

In some examples, when AMVD is implicitly applied to the joint MVD coding, the fractional precision MV refinement by bilateral matching is only allowed when the magnitude of MVD is equal to or less than one threshold or the associated MV class is equal to or less than another threshold. In one example, the fractional precision MV refinement by bilateral matching is only allowed when the magnitude of MVD is equal to or less than 1 pel sample. In one example, the fractional precision MV refinement by bilateral matching is only allowed when the associated MV class is equal to or less than MV_CLASS_0. For example, determining the refining granularity of the MVD comprises implementing a fractional precision MVD refinement only when the magnitude of the MVD is equal to or less than a threshold.

In some examples, when AMVD is implicitly applied to the joint MVD coding, precision/granularity for MV refinement with bilateral matching may become monotonically coarser as the magnitude (or MVD class) of MVD increases.

In some examples, when AMVR is explicitly signaled for the joint MVD coding, precision/granularity for MV refinement with bilateral matching may become monotonically coarser as the precision of MVD decreases. In one example, only full-pel MVD refinement is supported when the precision of MVD is coarser than 1-pel, such as 2-pel or 4-pel.

In some examples, when adaptive MVD resolution is applied, the finest allowed MVD resolution depends on whether bilateral matching is applied or not. In one example, when bilateral matching is applied, the finest allowed MVD resolution is lower than the finest allowed MVD resolution without bilateral matching being applied. In one example, when adaptive MVD resolution is applied, if the finest allowed MVD resolution is 1/8 pel when bilateral matching is not applied, then the finest allowed MVD resolution is 1/4 or 1/2 pel when bilateral matching is applied.

In one embodiment and/or any combination of the embodiments disclosed herein, the MV refinement for bilateral matching is restricted to certain pre-defined directions, such as horizontal direction, vertical direction, or diagonal direction.

In some examples, the pre-defined searching directions can be signaled in high-level syntax, such as the sequence level, the frame level, or the slice level.

In one embodiment and/or any combination of the embodiments disclosed herein, the searching direction for MV refinement with bilateral matching may depend on the direction of MVD. For example, searching for the first prediction video block within the first reference frame and the second prediction video block within the second reference frame for the video block (530) comprises determining a search direction based on a direction of the MVD and searching based on the search direction.

In some examples, if the direction of MVD is along the horizontal or the vertical direction, the searching direction for MV refinement with bilateral matching is also restricted to the horizontal or the vertical direction.

In some examples, the searching direction for MV refinement with bilateral matching may be same to or perpendicular to the direction of the MVD.

In one embodiment and/or any combination of the embodiments disclosed herein, one high level syntax may be signaled to indicate whether bilateral matching is applied to adaptive MVD resolution (or AMVR) or not. For example, before searching, the decoder/encoder determines, based on a second syntax element from the video stream, whether a bilateral matching mode is signaled, and searches in response to a determination that the bilateral matching mode is signaled.

In some examples, this high-level syntax may be signaled in the sequence level, the frame level, or the slice level. For example, the second syntax element is signaled in one or more of sequence level, frame level, and/or slice level.

Although FIG. 5 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein.

In yet another aspect, some embodiments include a non-transitory computer-readable storage medium storing one or more sets of instructions for execution by control circuitry of a computing system, the one or more sets of instructions including instructions for performing any of the methods described herein.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of decoding a video stream performed at a computing system having memory and control circuitry, the method comprising:

receiving a video bitstream comprising a plurality of blocks, including a current block within a current frame;

determining, based on one or more syntax elements from the video bitstream, whether the current block is encoded using a joint adaptive motion vector difference (MVD) resolution mode, the joint adaptive MVD resolution mode being an inter-prediction mode with a MVD from a first reference frame and a second reference frame jointly signaled with an adaptive MVD pixel resolution;

receiving, from the video bitstream, a signaled MVD for the current block; and when the current block is encoded using the joint adaptive MVD resolution mode:

obtaining a first motion vector predictor (MVP) and a second MVP for the current block;

identifying a first reference block within the first reference frame using the first MVP and a second reference block within the second reference frame using the second MVP;

identifying a first prediction block within a first bilateral search area around the first reference block and a second prediction block within a second bilateral search area around the second reference block based on a minimum difference measured by a cost criterion between the first prediction block and the second prediction block;

deriving a first refined MVD by refining the signaled MVD based on the first prediction block and the second prediction block, wherein the first refined MVD is not signaled in the video bitstream and has a finer fractional pixel precision than the signaled MVD;

deriving a second refined MVD from the first refined MVD of the first reference frame according to a ratio of a first distance between the first reference frame and the current frame and a second distance between the second reference frame and the current frame;

deriving a motion vector (MV) of the current block using the second refined MVD; and reconstructing the current block using the refined MV.

2. The method of claim 1, wherein the second refined MVD of the second reference frame is derived from the first refined MVD of the first reference frame according to $$\text{refined}_{mvd_1} = \left(\frac{td1}{td0}\right) * \text{refined}_{mvd_0},$$

wherein td0 is the distance between the first reference frame and the current frame, td1 is the distance between the second reference frame and the current frame, and $\text{refined}_{mvd_0}$ and $\text{refined}_{mvd_1}$ are the first refined MVD of the first reference frame, and the second refined MVD of the second reference frame respectively.

3. The method of claim 1, wherein the cost criterion includes a distortion cost of one or more positions modified by a factor to make the one or more positions more or less preferable during the minimum difference measurement.

4. The method of claim 1, wherein a search area size for the first bilateral search area is based on a precision of the signaled MVD.

5. The method of claim 1, wherein refining the signaled MVD comprises determining a refining granularity of the signaled MVD based on at least one of: a precision of the signaled MVD, a magnitude of the signaled MVD, and an associated MV class of the signaled MVD.

6. The method of claim 5, wherein determining the refining granularity of the signaled MVD comprises implementing a fractional precision MVD refinement only when the magnitude of the signaled MVD is equal to or less than a threshold.

7. The method of claim 1, wherein the first prediction block within the first reference frame is identified using a search direction that is based on a direction of the signaled MVD.

8. A method of video encoding performed at a computing system having memory and control circuitry, the method comprising:

receiving video data comprising a plurality of blocks, including a current block within a current frame;

determining whether the current block is to be encoded using a joint adaptive motion vector difference (MVD) resolution mode, the joint adaptive MVD resolution mode being an inter-prediction mode with a MVD from a first reference frame and a second reference frame jointly signaled with an adaptive MVD pixel resolution;

determining an initial MVD for the current block;

signaling the initial MVD in a video bitstream; and when the current block is to be encoded using the joint adaptive MVD resolution mode:

obtaining a first motion vector predictor (MVP) and a second MVP for the current block;

identifying a first reference block within the first reference frame using the first MVP and a second reference block within the second reference frame using the second MVP;

identifying a first prediction block within a first bilateral search area around the first reference block and a second prediction block within a second bilateral search area around the second reference block based on a minimum difference measured by a cost criterion between the first prediction block and the second prediction block;

deriving a first refined MVD by refining the initial MVD based on the first prediction block and the second prediction block, wherein the first refined MVD is not signaled in the video bitstream and has a finer fractional pixel precision than the initial MVD;

deriving a second refined MVD from the first refined MVD of the first reference frame according to a ratio of a first distance between the first reference frame and the current frame and a second distance between the second reference frame and the current frame;

deriving a motion vector (MV) of the current block using the second refined MVD; and encoding the current block using the refined MV.

9. The method of claim 8, wherein the cost criterion includes a distortion cost of one or more positions modified by a factor to make the one or more positions more or less preferable during the minimum difference measurement.

10. The method of claim 8, wherein a search area size for the first bilateral search area is based on a precision of the initial MVD.

11. The method of claim 8, wherein refining the initial MVD comprises determining a refining granularity of the initial MVD based on at least one of: a precision of the initial MVD, a magnitude of the initial MVD, and an associated MV class of the initial MVD.

12. The method of claim 8, wherein the first prediction block within the first reference frame is identified using a search direction that is based on a direction of the initial MVD.

13. A non-transitory computer-readable storage medium storing a video bitstream that is generated by a video encoding method, the video bitstream comprising:

coded information for a plurality of blocks of video data, including a current block within a current frame;

an indicator indicating that the current block is encoded using a joint adaptive motion vector difference (MVD) resolution mode; and a signaled MVD jointly signaled with an adaptive MVD pixel resolution; and wherein the video encoding method comprises, when the current block is encoded using the joint adaptive MVD resolution mode:

obtaining a first motion vector predictor (MVP) and a second MVP for the current block;

identifying a first reference block within a first reference frame using the first MVP and a second reference block within a second reference frame using the second MVP;

identifying a first prediction block within a first bilateral search area around the first reference block and a second prediction block within a second bilateral search area around the second reference block based on a minimum difference measured by a cost criterion between the first prediction block and the second prediction block;

deriving a first refined MVD by refining an initial MVD based on the first prediction block and the second prediction block, wherein the first refined MVD is not signaled in the video bitstream and has a finer fractional pixel precision than the initial MVD;

deriving a second refined MVD from the first refined MVD of the first reference frame according to a ratio of a first distance between the first reference frame and the current frame and a second distance between the second reference frame and the current frame;

deriving a motion vector (MV) of the current block using the second refined MVD; and encoding the current block using the refined MV.

14. The non-transitory computer-readable storage medium of claim 13, wherein the second refined MVD of the second reference frame is derived from the first refined MVD of the first reference frame according to $$\text{refined}_{mvd_1} = \left(\frac{td1}{td0}\right) * \text{refined}_{mvd_0},$$

wherein td0 is the distance between the first reference frame and the current frame, td1 is the distance between the second reference frame and the current frame, and $\text{refined}_{mvd_0}$ and $\text{refined}_{mvd_1}$ are the first refined MVD of the first reference frame, and the second refined MVD of the second reference frame respectively.

15. The non-transitory computer-readable storage medium of claim 13, wherein the cost criterion includes a distortion cost of one or more positions modified by a factor to make the one or more positions more or less preferable during the minimum difference measurement.

16. The non-transitory computer-readable storage medium of claim 13, wherein a search area size for the first bilateral search area is based on a precision of the signaled MVD.

17. The non-transitory computer-readable storage medium of claim 13, wherein refining the signaled MVD comprises determining a refining granularity of the signaled MVD based on at least one of: a precision of the signaled MVD, a magnitude of the signaled MVD, and an associated MV class of the signaled MVD.

18. The non-transitory computer-readable storage medium of claim 13, wherein the first prediction block within the first reference frame is identified using a search direction that is based on a direction of the signaled MVD.

* * * * *